United States Patent [19]

Ashcroft

[11] 4,011,122
[45] Mar. 8, 1977

[54] METHOD FOR PRODUCING PLASTIC-COVERED CONTAINERS

[75] Inventor: Richard I. Ashcroft, Alameda, Calif.
[73] Assignee: Owens-Illinois, Inc., Toledo, Ohio
[22] Filed: Sept. 29, 1975
[21] Appl. No.: 617,884

Related U.S. Application Data

[62] Division of Ser. No. 464,224, April 25, 1974, Pat. No. 3,959,065.
[52] U.S. Cl. .............................. 156/86; 156/294; 215/12 R
[51] Int. Cl.² ........................................ B29C 27/00
[58] Field of Search ............ 156/86, 290, 293, 294, 156/215, 497, 499, 556, 578, DIG. 9, DIG. 10; 215/12 R

[56] References Cited

UNITED STATES PATENTS

| | | | |
|---|---|---|---|
| 3,542,229 | 11/1970 | Beyerlein et al. | 156/86 |
| 3,604,584 | 9/1971 | Shenk | 156/86 |
| 3,607,496 | 9/1971 | Kissell | 156/556 |
| 3,760,968 | 9/1973 | Amberg et al. | 215/12 R |
| 3,767,496 | 10/1973 | Amberg et al. | 156/86 |
| 3,802,942 | 4/1974 | Amberg et al. | 156/86 |

Primary Examiner—Caleb Weston
Attorney, Agent, or Firm—J. R. Nelson

[57] ABSTRACT

The disclosure relates to method and apparatus for producing a base article, such as a container, with a shrunken, surface covering of plastic thereon. While conveyed in axial registry with each other, a sleeve form of shrinkable plastic is telescopically assembled onto the article by a cam-operated push-up element and held in place until the article and sleeve enter a heating device for applying heat to a relatively narrow, bank-like region of the sleeve about the article causing the plastic of that region to shrink into gripping engagement with the article to hold the sleeve in place until the next step of the process, e.g. the total heat shrinking of the sleeve on the article. The heating device structure is comprised of opposed elongated nozzles through which hot air of 200°–900° F is applied in a narrow horizontal pattern. The article is conveyed between the opposed nozzles, and during travel therethrough the article is rotated.

8 Claims, 5 Drawing Figures

METHOD FOR PRODUCING PLASTIC-COVERED CONTAINERS

This is a division of application Ser. No. 464,224 filed Apr. 25, 1974, now U.S. Pat. No. 3,959,065.

The invention relates to the manufacture of containers in which a preliminary sleeve form, usually a hollow right cylinder form of a foamed plastic material, is telescopically placed over an article of basic shape and shrunken thereon into article conformity.

The invention comprises an improvement of the method performed in U.S. Pat. No. 3,767,496 and the apparatus disclosed in copending application Ser. No. 209,751 filed Dec. 20, 1971, now U.S. Pat. No. 3,802,942, both of common ownership with the present application.

BACKGROUND OF THE INVENTION

In the process and apparatus for making plastic coated, composite containers, such as is disclosed in U.S. Pat. No. 3,760,968, a manufactured glass bottle is loaded onto a conveyor and transported through a pre-heat apparatus whereat the temperature of the bottle is increased to 175°–300° F. Upon leaving the pre-heat apparatus, the conveyor is guided in a horizontal path around an arcuate end-turn in which plastic sleeves carried on an underlying turret register with the bottles and are moved vertically in a telescopic assembly over the lower ends of the bottles. From that point of assembly, the sleeves are carried on the bottles as the conveyor moves into a heating apparatus, such as a tunnel oven, wherein the temperature, maintained on the order of 175°–800° F, depending on the composition of the plastic of the sleeves, shrinks the sleeves into a snug fitting, comforming relationship over the bottle surface where assembled.

At low production rates, i.e. conveyor speeds, the sleeve will initially shrink enough on the pre-heated bottles to travel from the turret assembly point to the oven without slipping or otherwise dislocating itself on the bottle. Production speeds over 200 bottles per minute may cause some dislocation of the sleeve members from initial assembly. It is, therefore, one of the important objects of the present invention to provide a method and means to positively secure the sleeve in the initial telescopic assembly position on the base article to prevent dislocation of the sleeve before overall shrinking even at high production speeds, i.e. in excess of 200 B.P.M.

Another object of the invention is to provide such method and apparatus for assuring against dislocation without increasing pre-heat temperature of the base article over values in current practice; or without the use of external handling mechanism engaging the sleeve to hold it in place between the turret assembly point and the shrink oven.

SUMMARY OF THE INVENTION

The present invention, as is disclosed hereinafter in terms of a specific, preferred embodiment, provides a step in the method of applying a relatively narrow elongated band of heat onto the sleeve exterior at the time the latter is assembled onto the base article being carried by the conveyor, and thereafter for a finite distance in travel toward the shrink oven. The heat is preferably furnished by hot air applied from opposed nozzle banks on either side of the path of the article and closely adjacent thereto. The nozzles are positioned at the proper elevation for zonally shrinking a band region of the sleeve about an adjacent band-like part of the bottle for holding it rather firmly thereon until the sleeve and article travel the sufficient distance into the final heating treatment for complete, overall shrinking of the sleeve on the base article form.

The apparatus provides an arcuate nozzle means conforming to a portion of the conveyor arcuate path, as disclosed herein, and in its broadest sense, the heat tacking means corresponds to the conveyor path in a portion it takes just after the sleeve is telescoped to assembly position by the turret means that handles the sleeve up to that point.

Another feature of the invention is the provision of means for rotating the bottle just as the sleeve is released to it by the turret apparatus for evenly applying the heat for tack-shrinking a band portion of the sleeve about the bottle as the two are conveyed through the opposed tacking nozzles.

A further feature in the apparatus improvement of this invention is the provision of an extended dwell time in the raising motion of the turret machine stripper element or sleeve push-up to assure an overlap in time of the cycle between assembly of the sleeve over the bottle to the fully raised position and the entry of the bottle and sleeve into the zonal tacking heat application. Since the push-up element is cam operated, the improved apparatus of the invention will insure some cam-dwell time after raising the sleeve to full elevation on the bottle before the sleeve push-up element is cammed downwardly (retracted).

Several other attendant objects and advantages of the invention will become apparent to those skilled in the art from the description and drawings of the invention, as will presently appear herein.

DESCRIPTION

Figure 1:
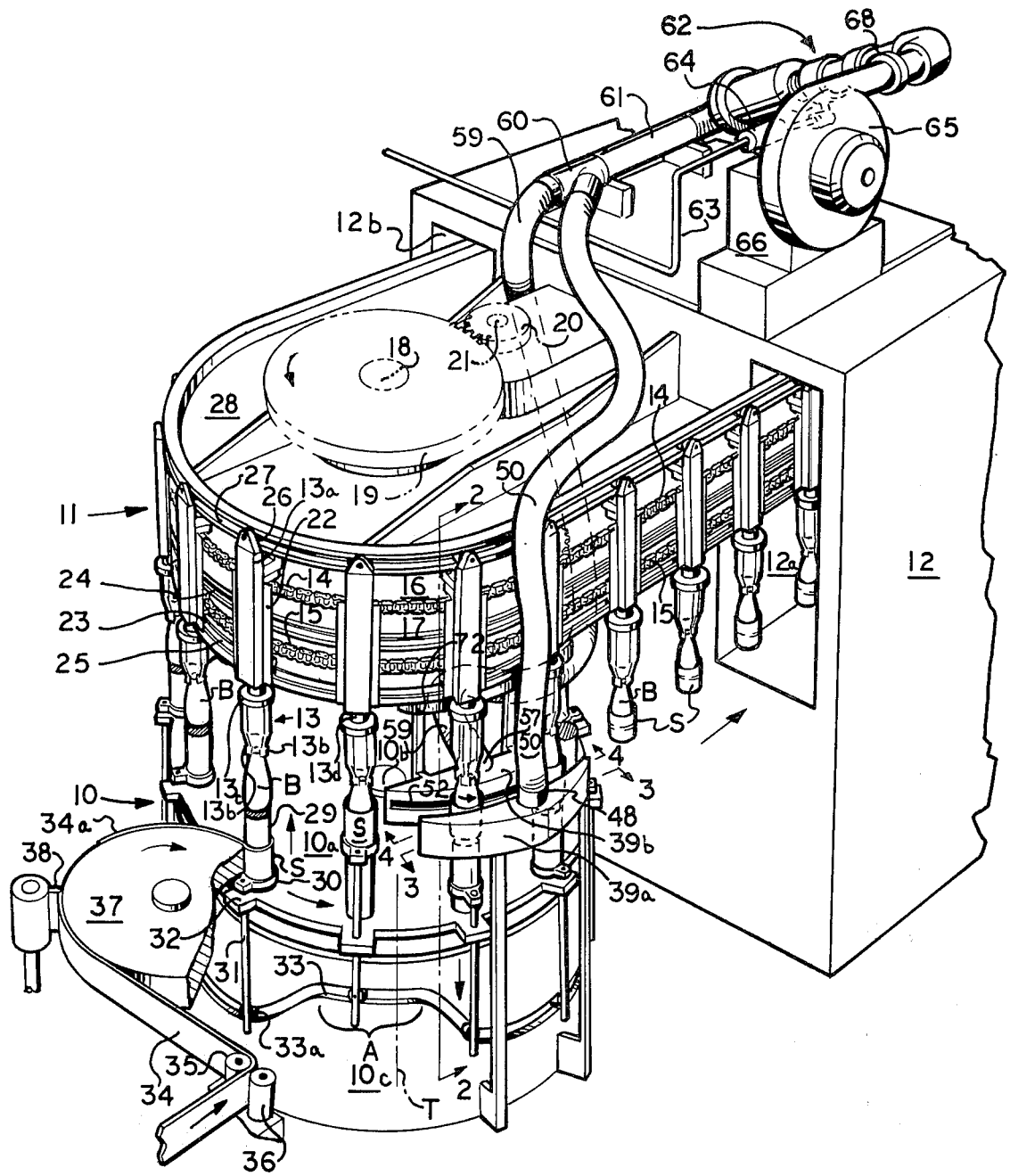
FIG. 1 is a three-quarter front perspective view of a machine for applying plastic sleeves onto glass bottles, and incorporates the improvements of the present invention.

Shown on FIG. 1 is a machine for producing plastic sleeves on a turret machine 10, assembling them telescopically over rigid base articles carried by the conveyor 11 and shrinking them thereon in a heating apparatus 12. The rigid base articles in the examples of the present disclosure are the glass bottles B; and, after having a shrunken plastic covering thereon, form a composite package of the type described and shown in U.S. Pat. No. 3,760,968.

THE MACHINE

The bottles B are fed to and loaded on the neck gripping overhead chucks 13 connected to an endless driven carriage comprised of upper and lower chains 14 and 15, respectively, extending around end-turn gears 16 and 17 each keyed onto the vertical shaft 18. A bull gear 19 is also connected at the upper end of shaft 18 in mesh with drive gear 20 connected to the power drive means (not shown) by the drive shaft 21. Power is transmitted to gear 19 to rotate it and shaft 18 counter-clockwise on FIG. 1 and drive the chains 14, 15 in a counter-clockwise direction through the endless path of the conveyor. Chucks 13 are mounted on carriage brackets 22 connected to links of the chains 14, 15. The several carriage brackets have spaced rollers 23 on their back sides running in stationary tracks 24 and 25 around the path of the conveyor. The chucks 13 are each vertically, slidably mounted on their respective carriage brackets 22 and the vertical elevation of chucks 13 is controlled by the cam roller 26 rotatably connected on the upper element 13a of the chunk running in cam track 27 fastened rigidly on the machine. The chucks 13 have three lower jaws 13b which open and close about the top end of bottle B. The jaws 13b are attached to a circular arbor including a wheel element 13c that is rotatable about shaft 13d of the chuck so that friction engagement of the periphery of the wheel element 13c of the arbor with a stationary element (to be described hereinafter) anywhere along the path of the conveyor imparts rotation of the chucks and bottles thereon about the axis of the shaft 13d.

The end turn portion of the conveyor mechanism is supported by the upper frame 28 rigidly supported on the front wall of the oven 12.

Beneath the conveyor end-turn portion, just described, is the rotary sleeve turret 10 which is coaxial with the vertical shaft 18. Turret machine 10 is comprised of an upper annular turret 10a rotated counter-clockwise about shaft 10b over the lower stationary frame 10c.

The turret machine 10 includes a plurality of spaced mandrels 29 mounted on turret 10a whose peripheral spacing on turret 10a coincides radially and with the peripheral spacing of chucks 13 in the end-turn portion of the conveyor path. The chucks 13 have their centers in registry with the vertical central axes of underlying mandrels 29. At the base of each mandrel in an inactive position there is an annular, encircling push-up bar or stripper element 30 connected onto a vertical operating rod 31 by an arm. Rods 31 are each vertically slidable on the guides 32 connected with turret 10a and under control of the circular cam 33 extending around frame 10c in which a cam roller 33a connected to rod 31 is in running engagement. The cam 33 is a stationary element of turret frame 10c. The pattern of the rise and fall of cam 33 provides the proper vertical reciprocating motion to rod 31 and push-up bar 30 responsive to rotary movement of turret 10a.

Connected for operation with turret machine 10 is mechanism for feeding a supply of plastic strip stock and forming it to sleeve lengths. The strip stock is shown as a running web 34 guided through opposed feed rollers 35, 36 and onto the sleeve drum 37. The web 34 on drum 37 has forward lengths cut therefrom by rotary knife 38, and the cut lengths 34a are held onto drum 37 by vacuum until the leading edge thereof engages a mandrel 29 of turret 10a. The mandrel at this point is engaged by its drive means of the turret machine to rotate it more than 360° winding the strip 34a about a mandrel 29 in an end-to-end overlap of the strip to form a cylindrical shape. Thereafter, means on the turret machine connect the overlapped ends at a vertical seam to complete formation of a cylindrical, hollow sleeve S of the plastic material.

An example of the plastic material is given in the aforementioned U.S. Pat. No. 3,767,496 which, briefly stated, comprises a polystyrene or other thermosplastic that is highly oriented in the longitudinal dimensions of the web (circumference of sleeve S) in relation to any orientation of the plastic in the transverse dimension (height of sleeve S). Examples of material that may be run in form of web 34 are foamed polystyrene on the order of 0.010–0.018 inch thickness or foamed polyethylene on the order of 0.008–0.015 inch thickness. Both are highly oriented in the running direction of web 34.

The inner circumference of sleeve S is slightly more than the exterior circumference of the article B so that the sleeve S may be telescopically applied over article B to a desired elevation on the latter. The preferred thermoplastic may be of foamed structure and such a material on the order of 10 thousandths of an inch or greater in thickness provides a suitable sleeve S for handling on the machine.

After the plastic strip 34a is wound on mandrel 29 and seamed to form sleeve S, the mandrel 29 and chuck 13 travel together through an assembly station during which the two are at zero angular velocity and displacement with respect to each other. In this span of travel, roller 33a begins its rise on cam 33, and push-up bar 30 rises on mandrel 29, which elevates sleeve S into the telescopic assembly on bottle B. Sleeve S is supported thusly by push-up bar 30 during the flat span A of cam 33. At the point where bottle B and sleeve S thereon enter a space between the opposed tacking nozzle means 39a and 39b, the cam 33 falls away and push-up bar 30 is retracted from supporting contact with sleeve S. This entry point is released on FIG. 1 by the vertical dashed line T.

SLEEVE TACKING APPARATUS

Figure 2:
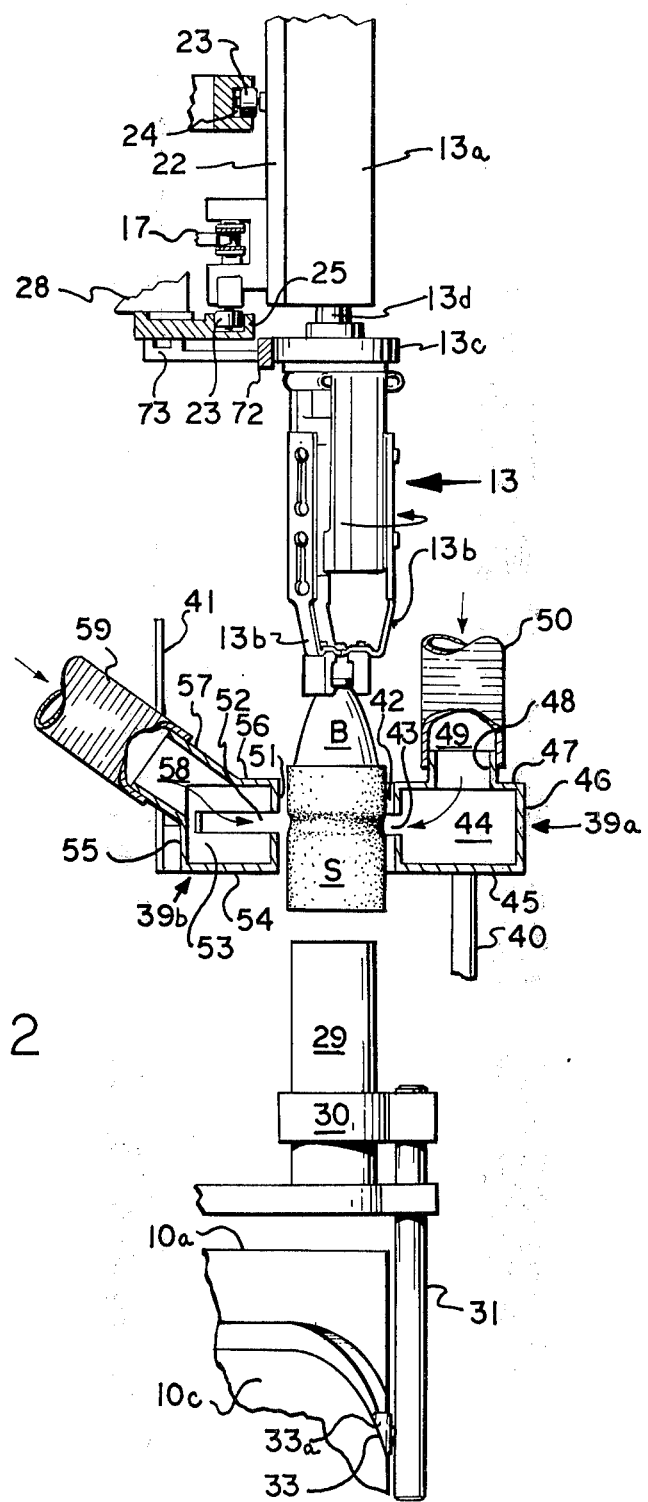
FIG. 2 is a sectional elevational view taken on a line 2—2 on FIG. 1.
Figure 3:
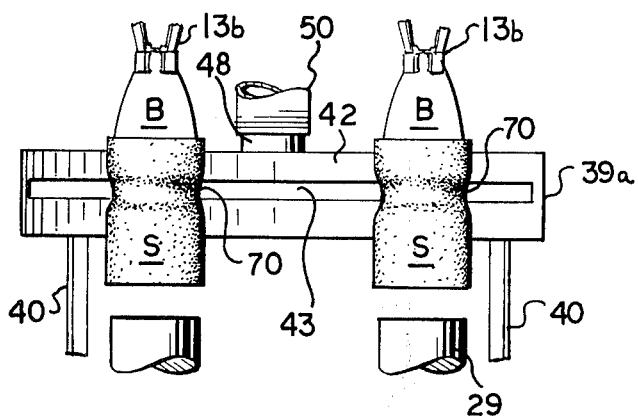
FIG. 3 is a fragmentary elevational view taken on a line 3—3 on FIG. 2 of the bottles and the radially innermost sleeve tacking nozzle of the invention.
Figure 4:
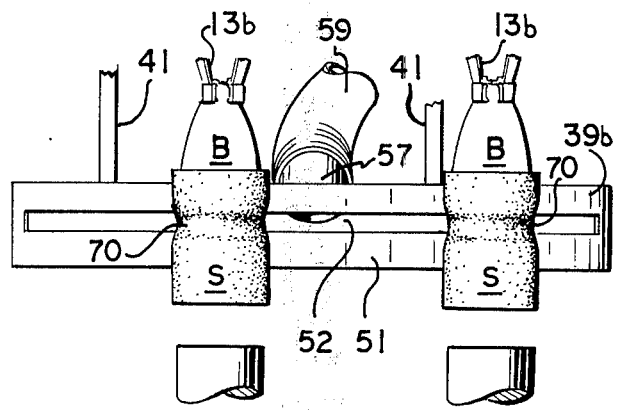
FIG. 4 is a fragmentary elevational view like FIG. 3 but taken on a line 4—4 on FIG. 1 of the bottles and the radially outermost sleeve tacking nozzle of the invention.

As shown on FIGS. 2–4, the elongated nozzle means 39 of the invention comprises two opposed hot air nozzles that are contoured to the path the article B must take in its carriage beyond the point where the plastic sleeve is assembled over article B. The outside nozzle member 39a is supported on vertical members 40 secured to the turret frame 10c (FIG. 1). The inside nozzle member 39b is disposed radially inwardly from the member 39a and is substantially parallel thereto, member 39b being supported on vertical standards 41 connected to the overhead frame 28 of the conveyor.

Nozzle member 39a has an inwardly facing, arcuate concave face 42 having an elongated slot 43 formed through the face and in communication with chamber 44; the latter being formed by the bottom wall 45, outer vertical side wall 46 an the top wall 47. The outer vertical wall 46 and inner face 42, at their respective end extremities, are joined to close the chamber 44 on all sides except for slot 43. Top wall 47 has an upstanding, circular pipe wall 48 defining opening 49 into chamber 44. Opening 49 is connected to a source of heated air or gaseous media (to be described) via flexible conduit 50 encircling wall 48.

Nozzle member 39b is somewhat similarly constructed to include an arcuate, convex face 1 that correspondingly parallels and opposes face 42 of the other member 39a, just described. Face 51 includes an elongated slot 52 that is situated at the same elevation as the opposite slot 43. The space between the convex face 51 and the concave face 42 is slightly greater than the diameter of the combination of bottle B with sleeve S in place thereon (see FIG. 2). Slot 52 communicates with interior chamber 53 defined by bottom wall 54, back wall 55 and top wall 56. The end extremities of back wall 55 and face 51 are connected to close the chamber 53 except for slot 52. An upwardly angled circular pipe wall 57 is connected into the top wall 56 and back wall 55 providing an opening 58 connecting into chamber 53, and a flexible conduit 59 encircles 57 for connecting the source of heated air or gaseous media into chamber 53.

Although nozzle openings are shown and described as slots 43 and 52, other nozzle forms will be suitable as alternative constructions, such as for example, plural, aligned slots, perforations along the nozzle face or a series of jets. The nozzle means of the invention embodies the various constructions which may functionally apply the opposed band heat to the plastic sleeve as the latter moves along the former.

The conduits 50 and 59 (FIG. 1) are connected at the Y-connector pipe 60 that is a part of pipe 61. A gas-fired burner 62 has its outlet connected to the opposite end of pipe 61 and gaseous hydrocarbon fuel or natural gas is furnished to burner 62 by fuel line 63 through regulator 64 and into the burner manifold. The fuel is ignited and burned in the known manner in burner 62 to furnish heated air at the outlet to pipe 61. Air in regulated volume is furnished to the burner by the blower 65 mounted on top of the oven chamber 12 and powered by an electric motor indicated at 66 connected to rotate blower 65. The outlet 67 of blower 65 is connected into the air intake of burner 62 by pipe 68. The blower 65 is operated in conjunction with burner 62 to supply the heated air into chambers 44 and 53 of the nozzle members 39a and 39b through conduits 50 and 59, respectively, at temperature in the range 200°–900° F and approximately 500 cfm. This heated air is forced through nozzle slots 43 and 52 (FIG. 2) and onto an exterior band region of sleeve S over bottle B. The heat is sufficient to promptly shrink the aforementioned plastic material of a band-like region of sleeve S firmly about the bottle B and hold the sleeve in its place thereon at proper elevation.

At the underside of the carriage frame below guide rail 25 (FIGS. 1 and 2) there is mounted a friction rail 72 supported by cantilevered brackets 73. Friction rail 72 has an arcuate front surface that conforms with the path the chucks 13 will travel past nozzles 39a and 39b. The friction rail 72 thereby engages the periphery of the annular driving (wheel) element 13c of each of the chucks 13 just as they enter the space between nozzles 39a, 39b and the rail extends along the span of the nozzles in the conveyor path. At the time the wheel element 13c engages rail 72, rotation is imparted to the chuck 13 by the wheel rolling on the rail 72 along its length. The length of the rail may be varied to obtain desired amount of rotation. By rotation of the article during its traverse of the nozzle means, heat is applied more evenly in the annular band-like region around the sleeve.

Figure 5:
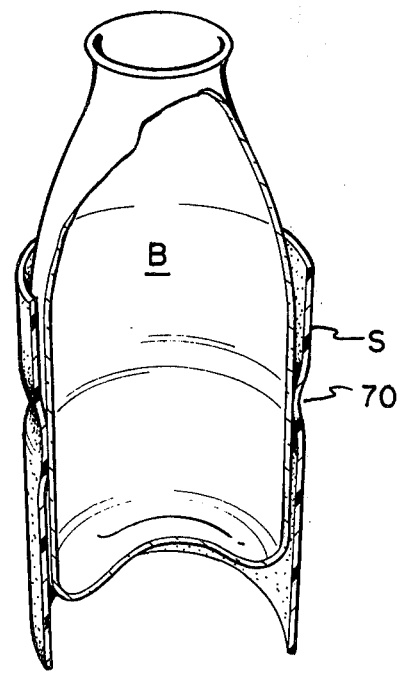
FIG. 5 is a spatial perspective view, partly broken away, showing the relationship of the plastic sleeve on the glass bottle after it traverses the sleeve tacking nozzle apparatus on the machine of FIG. 1.

A shown on FIGS. 3–5, this band-like region is shown by the pinched region 70 (exaggerated in extent on the drawings for clarity of illustration). The relationship of sleeve S on article B after traversing the nozzles 39a, 39b is illustrated in the sectioned view of FIG. 5, wherein a bottle B has a cylindrical sleeve S of a shrinkable plastic thereon, a narrow annular band-like region 70 of the sleeve being shrunken (pinched) into firm band-like engagement with the exterior bottle surface, thereby holding the sleeve in place for travel from the nozzles (FIG. 1) into the final heating device 12.

The heating device 12 may be one of several available sources of heat, such as, heated air circulated across the tunnel 12a, banks of infrared heater elements, such as lamps or resistance (cal-rod) heater elements, etc. The heat applied to the sleeves comprised of a foamed polystyrene of the thickness herein mentioned, during longitudinal travel of tunnel 12a is on the order of 400° F for a period of 4–6 seconds. For different compositions or densities, thicknesses, etc. of the plastic material, this heat may be altered accordingly to perform the shrinkage. But, this second heat shrinkage treatment applied on the sleeve shrinks all of the sleeve S into conforming relationship snugly over the bottle B where applied.

Thus, the method herein employed utilizes two heat applications to the sleeve after it is placed on the base article, one a partial or zonal heat for tacking the sleeve in place, and the second, a complete and overall heat for shrinking the sleeve into a conforming covering of the article where applied.

Other forms of heating devices may be used in connection with or as replacements for the hot air nozzles; the latter being disclosed as the preferred mode of the invention because of its satisfactory performance and economy of operation.

The preferred mode of operation, as described hereinabove, includes the step in the method and the apparatus on the machine for rotating the articles B by the chucks during travel through the length of nozzles 39a, 39b. The rotation principle gives optimum results; however, the method and apparatus will function satisfactorily, i.e. the sleeve will be tacked in place on the article for further transport, without the rotation of the article through the heat applying nozzle means 39.

On the drawings on FIG. 1, the heating apparatus 12 includes a pre-heat tunnel 12b through which bottles B may be initially conveyed for pre-heating the articles prior to plastic sleeve assembly. This preheating step is described in the said U.S. Pat. No. 3,767,496.

Other and further modifications may be resorted to without departing from the spirit and scope of the appended claims.

What is claimed is:

1. The method of forming an encircling plastic covering on elongated base articles comprising:
 conveying base articles in a first path with their longitudinal axes perpendicular to the direction of movement,
 moving hollow body sleeves of a heat shrinkable plastic material in a separate, second path spaced from the articles, a portion of said second path being parallel with said first path so that the central longitudinal axes of said sleeves are substantially in a coaxial relationship with said articles, the sleeves having an interior cross dimension slightly larger than the exterior cross dimension of said articles, during said movements, telescopically transferring the sleeve over each article by movement in said coaxial direction to a position whereat the sleeve is placed over at least a portion of the article for movement with the latter in said first path, conveying the transferred sleeve and article together in said first path through a subsequent portion thereof past a zonal heating device for applying tacking heat to an annular exterior band region of the sleeve adjacent said article, thereby shrinking said annular band of the sleeve onto the article holding the sleeve in place on the article, conveying the sleeve and article further in said first path into and through a heat applying device, and applying heat to said sleeve sufficient to completely shrink it into a snug, conforming, encircling relationship on the surface of said article.

2. The method of claim 1, wherein the sleeve and article conveyed in said first path past said zonal heating device are axially rotated during the application of heat by said device.

3. The method of making a container having an encircling plastic covering thereon comprising conveying containers in line in an upright position along a first path, moving heat shrinkable plastic sleeves in line in an upright position along a second path that includes a portion in underlying axial registry with containers being conveyed along said first path, transferring the registered sleeves to overly the respective containers while in registry in said first and second paths, holding the sleeves in said transferred position while moving the containers and sleeves through a narrow band of heat directed onto a zone of the sleeves and sufficient to shrink said sleeves annularly at said zone for holding the sleeves in said position on the containers, and thereafter moving the containers and sleeves held thereon in said first path through a heating zone wherein the sleeves are sufficiently heated to completely shrink them snugly over the container exterior surface.

4. The method of claim 3, wherein the zonally applied first heating step comprises directing an elongated narrow stream of heated air disposed along the said first path against said zone of the sleeve, said air being in the range of 200°–900° F.

5. The method of claim 3, wherein the heat shrinkable plastic sleeves are comprised of a foamed and highly oriented polyethylene material in the range of 0.010 to 0.050 inches in thickness.

6. The method of claim 3, wherein the sleeves are comprised of a heat shrinkable foamed thermoplastic material selected from the group consisting of polystyrene and polyethylene.

7. The method of claim 3, wherein the container comprises a glass container.

8. The method of claim 7, wherein the heat shrinkable plastic sleeves are comprised of a foamed and highly oriented polystyrene material in the range of 0.010 to 0.050 inches in thickness when in form of the unshrunken sleeve.

* * * * *